April 27, 1926.

G. D. GRAY 1,582,214

AUTOMATIC GLOBE VALVE CLOSING DEVICE

Filed Sept. 8, 1925

Inventor
Gordon D. Gray
by Fetherstonhaugh & Co.
Attys

Patented Apr. 27, 1926.

1,582,214

UNITED STATES PATENT OFFICE.

GORDON DUNCAN GRAY, OF STOUGHTON, SASKATCHEWAN, CANADA.

AUTOMATIC GLOBE-VALVE-CLOSING DEVICE.

Application filed September 8, 1925. Serial No. 55,106.

*To all whom it may concern:*

Be it known that I, GORDON DUNCAN GRAY, a subject of the King of Great Britain, and a resident of the village of Stoughton, in the Province of Saskatchewan, Canada, have invented certain new and useful Improvements in Automatic Globe-Valve-Closing Devices, of which the following is the specification.

My invention relates to improvements in automatic globe valve closing devices, and the object of the invention is to devise means whereby during the closing of the valve the danger incident to the attendant from the bursting of the pipe leading from the valve and in close proximity to such attendant is avoided, and it consists essentially of the arrangement and construction of parts as hereinafter more particularly explained.

In the drawings like characters of reference indicate corresponding parts in each figure.

Figure 1:
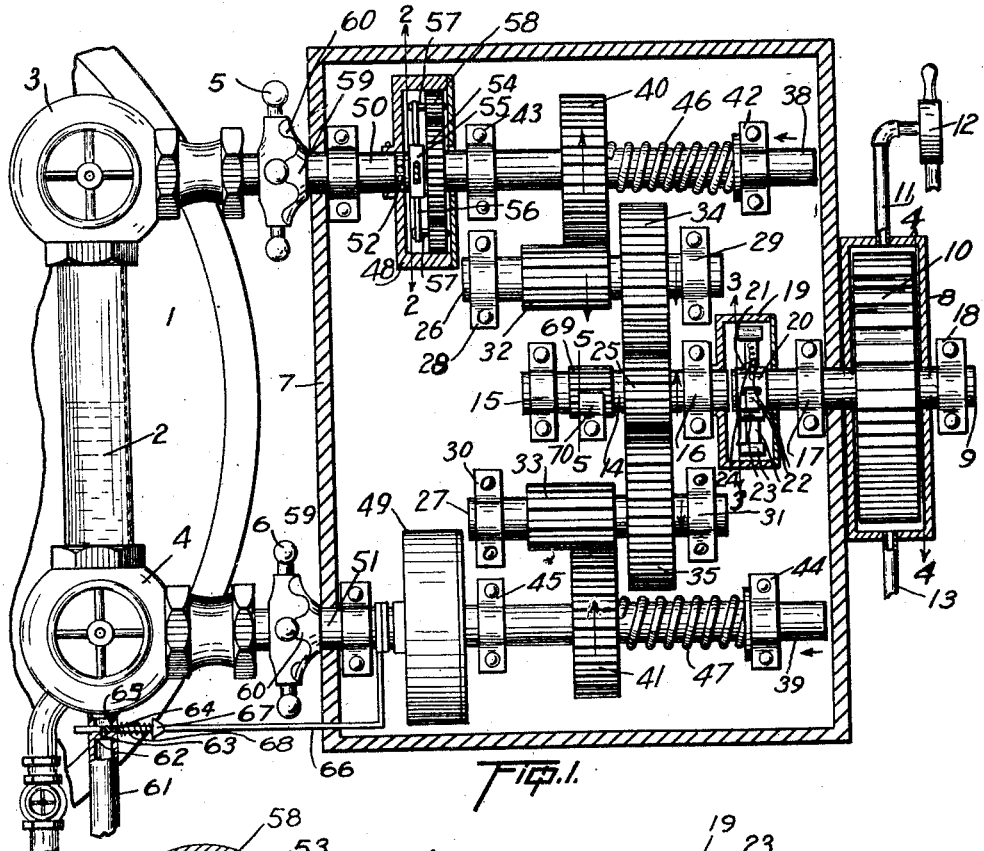
Fig. 1 is a view in elevation of my apparatus applied to a locomotive water glass connection.

1 indicates a portion of a locomotive boiler head.

2 is a gauge glass provided at its upper and lower end with the globe valves 3 and 4 operated by the usual handles 5 and 6.

7 is a casing which is suitably supported adjacent the boiler head.

8 is a turbine casing in which is journalled a shaft 9.

10 is a turbine wheel of any suitable construction secured to the shaft.

11 is an air inlet provided with a controlling valve 12 of any suitable type.

13 is the air exhaust leading from the casing 8.

14 is a shaft in axial alignment with the shaft 9 mounted in bearings 15 and 16. The shaft 9 is supported in bearings 17 and 18.

19 is a hollow drum secured to the shaft 14.

20 is a ring secured to the shaft 9 provided with lugs 21 to which are pivoted clutch arms 22 provided with shoes 23, the free ends of the arms being connected by tension springs 24 to the collar 20.

As the shaft 9 gains speed, the shoes are carried outward by centrifugal force against the tension of the springs 24 and into contact with the internal periphery of the drum 19 thereby providing a driving connection between the shafts 9 and 14.

25 is a gear wheel secured to the shaft 14.

26 and 27 are counter shafts. The shaft 26 is journalled in bearings 28 and 29, and the shaft 27 in bearings 30 and 31.

32 and 33 are broad pinions secured respectively to the shafts 26 and 27.

34 and 35 are gears secured to the counter shafts 26 and 27 and meshing with the gear 25 at diametrically opposite sides thereof.

It will be seen that when the turbine wheel 10 is rotated in the direction of arrow the gears 34 and 35 being rotated from right to left also as indicated by arrow, rotating the counter shafts 26 and 27 in the same direction and the broad pinions 32 and 33 secured to such counter shafts.

38 and 39 are longitudinally movable shafts.

40 and 41 are gears secured respectively to the shafts 38 and 39 in mesh respectively with the broad pinions 32 and 33. The shafts 38 and 39 are mounted respectively in bearings 42 and 43 and 44 and 45.

46 and 47 are compression springs surrounding the shafts 38 and 39 and extending between the bearings 42 and 44 and the gears 40 and 41 thereby tending to move the shafts 38 and 39 longitudinally in the direction of arrow.

48 and 49 are drums.

50 and 51 are valve handle operating shafts to which the drums 48 and 49 are secured.

Interposed between each pair of shafts 38 and 50 and 39 and 51 are located the ball bearings 52.

Figures 2, 3, 5:
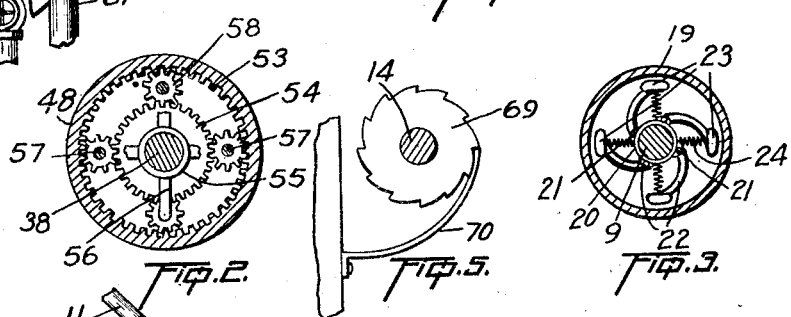
Fig. 2 is a sectional view on line 2—2 Figure 1.
Fig. 3 is a sectional view on line 3—3 Figure 1.
Fig. 5 is a sectional view on line 5—5 Figure 1.
Figure 4:
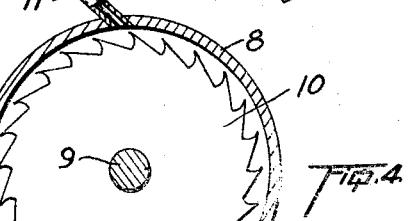
Fig. 4 is a sectional view on line 4—4 Figure 1.
Figure 6:
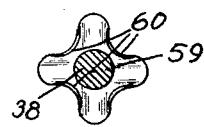
Fig. 6 is a detail of the foot 59.

Each drum 48 and 49 is provided with an internal gear 53, see Figure 2.

54 is a gear. A gear 54 is mounted on each shaft 38 and 39.

55 is a collar mounted freely on each shaft 38 and 39.

56 are arms radiating from each collar provided at their outer ends with studs 57 carrying planetary gears 58, the internal peripheral portion of which engage with the teeth of the internal gear 53, and the interior peripheral portion with the gear 54.

Each shaft 50 and 51 is provided with a foot 59. Each foot 59 is provided with radiating portions 60 having concaved faces engaging the arms of the valve handle 5 or 6.

The gears 40 and 41 when driven as above described rotate the gears 54 which drive the gears 58 revolving the drums 48 and 49 around each shaft 38 and 39 thereby driving the shafts 50 and 51 connected to such drums rotating the feet 59 which grip the valve handles 5 and 6 and thereby turn them to the closed position, the shafts 38 and 39 being carried longitudinally by means of the springs 46 and 47 so as to follow up the valve handles 5 and 6 as they move inward towards the closed position.

61 is a drip pipe leading from the valve 4 provided with a cross wall 62 provided with a drip perforation 63.

64 is a slide valve provided with a drip perforation 65.

66 is an operating rod for the valve provided with an enlargement 67 between which and the pipe 61 extends a compression spring 68.

When the valve closing mechanism is operated as above described and the shaft 39 moves longitudinally to follow up the valve handles 5 and 6, the valve operating rod 66 is also carried in the same direction so as to carry the perforation 65 into engagement with the perforation 63 and thereby allow the valve to drain. After the valves have been closed automatically as above described they may be opened manually whenever desired. When this is done the shafts 50 and 51 rotate with the valve handles 5 and 6 rotating the drums 48 and 49 and the gears 58 which then travel circumferentially around the gears 54 such gears being held stationary by means of the rotating gear 69 and the spring dog 70 which holds the shaft 50 stationary and thereby holds the major portion of the mechanism including the shafts 38 and 39 stationary, the springs 46 and 47 being each compressed as the valve handles 5 and 6 move outward carrying the shafts 38 and 39 in the opposite direction to arrow and returning the gears 40 and 41 to their normal position at the right hand end of the broad pinions 32 and 33.

From this description it will be seen that I have devised a very simple device whereby a valve may be automatically closed, such valve closing mechanism being operated at a distance from the valve obviating any danger to the attendant from the bursting of the pipe leading from the valve. This is particularly adaptable to gauge glass mechanism which often burst and injure the eyes of the attendant when operating the valves to close in the usual manner.

What I claim as my invention is:

1. The combination with a pair of the valve handles, of a pair of valve handle operating shafts, means carried thereby for engaging each valve handle, a pair of longitudinally movable shafts, a driving connection between the longitudinally movable shafts and the valve operating shafts permitting the free manually operated reverse movement of the valve operating shafts, spring means for forcing the longitudinal shafts inward to follow up the inward movement of the valve handles as they are rotated, a main driving shaft, means for rotating such driving shaft and a gear connection between the main driving and the longitudinally movable shafts.

2. The combination with a pair of globe valves and operating handles, of a pair of valve handle operating shafts, means carried thereby for engaging each valve handle, a pair of longitudinally movable shafts, a driving connection between the longitudinally movable shafts and the valve operating shafts permitting the free manually operated reverse movement of the valve operating shafts, spring means for forcing the longitudinal shafts inward to follow up the inward movement of the valve handles as they are rotated, a main driving shaft, means for rotating such driving shaft, a gear connection between the main driving and the movable shafts and comprising a supplemental driving shaft, a gear mounted thereon, counter shafts located at each side of the supplemental driving shaft, gears carried by the counter shaft in mesh with the gear of the supplemental shaft, a broad gear pinion carried by each counter shaft, and gears carried by the longitudinally movable shafts in mesh with the aforesaid broad gears, and a clutch connection between the driving shaft and the supplemental driving shaft.

3. The combination with a pair of globe valves and handles therefor, of a pair of valve handle operating shafts, means carried thereby for engaging each valve handle, a pair of longitudinally movable shafts, a driving connection between the longitudinally movable shafts and the valve operating shafts permitting the free manually operated reverse movement of the valve operating shafts, spring means for forcing the longitudinal shafts inward to follow up the inward movement of the valve handles as they are rotated, a main driving shaft, means for rotating such driving shaft, a gear connection between the main driving and the movable shafts and comprising a supplemental driving shaft, a gear mounted thereon, counter shafts located at each side of the supplemental driving shaft, gears carried by the counter shaft in mesh with the gear of the supplemental shaft, gears carried by the longitudinally movable shafts, broad gears carried by the counter shaft in mesh with aforesaid gears carried by the longitudinally movable shafts, and a clutch connection between the driving shaft and the supplemental driving shaft, and compression springs surrounding the longitudinally movable shafts bearing at one end against the gears thereof and at the opposite end against a suitable abutment.

4. In a device of the class described, the combination with a globe valve and handle, means for automatically turning the handle to carry the valve to the closed position comprising a valve handle operating shaft, a foot carried by such shaft engaging the handle, a longitudinally movable shaft, driving means for said shaft, a gear secured to the longitudinally movable shaft, an internal gear carried by the valve operating shaft, and planetary gears interposed between the gear of the longitudinally movable shaft and the internal gear, and means for freely supporting such planetary gears on the longitudinally movable shaft.

5. In a device of the class described, the combination with a clutch, valve and handle, means for automatically turning the handle to carry the valve to the closed position comprising a valve handle operating shaft, a foot carried by such shaft engaging the handle, a longitudinally movable shaft, driving means for said shaft, a gear secured to the longitudinally movable shaft, an internal gear carried by the valve operating shaft, and planetary gears interposed between the gear of the longitudinally movable shaft and the internal gear, means for freely supporting such planetary gears on the longitudinally movable shaft, and means for preventing the reverse rotary movement of the longitudinally movable shaft.

GORDON DUNCAN GRAY.